INVENTOR.
GEORGE E. HOWELL
BY
Barnes, Kisselle, Raisch & Choate
ATTORNEYS

Jan. 4, 1972   G. E. HOWELL   3,632,695

MAKING A COMBINED LENS AND REFLECTOR

Filed March 5, 1970   4 Sheets-Sheet 2

INVENTOR.
GEORGE E. HOWELL
BY
Barnes, Kisselle, Raisch & Choate
ATTORNEYS

Jan. 4, 1972 G. E. HOWELL 3,632,695
MAKING A COMBINED LENS AND REFLECTOR
Filed March 5, 1970 4 Sheets-Sheet 4

INVENTOR.
GEORGE E. HOWELL
BY
Barnes, Kisselle, Raisch & Choate
ATTORNEYS

United States Patent Office 3,632,695
Patented Jan. 4, 1972

3,632,695
MAKING A COMBINED LENS AND REFLECTOR
George E. Howell, Windsor, Ontario, Canada, assignor to Reflex Corporation of Canada Limited, Amherstburg, Ontario, Canada
Original application June 14, 1968, Ser. No. 737,152. Divided and this application Mar. 5, 1970, Ser. No. 26,456
Int. Cl. C23b 7/06, 7/08, 5/12
U.S. Cl. 264—1
6 Claims

ABSTRACT OF THE DISCLOSURE

A method of making a combined lens and reflector which comprises assembling a plurality of pins with shaped ends in a bundle, removing portions of the shaped ends of the pins at the areas where lenses are to be formed, forming a mold by electrodepositing metal on the areas of shaped ends and removing portions, thereafter machining the optical or lens surfaces into the portions of the electroformed mold corresponding to the removed portions of the master, and finally shaping a mass of plastic material onto the formed surface of the electroformed mold.

---

This application is a division of application Ser. No. 737,152, filed June 14, 1968.

This invention relates to the making of a combined lens and reflector.

In the making of lenses and reflectors, it is often advisable and desirable to form a unitary piece of plastic material into a combined lens and reflector so that the lens and reflector can be utilized to both transmit light from a light source and reflect light from another light source exteriorly. Such combined lenses and reflectors can be utilized, for example, on the sides of a vehicle or on the ends of the vehicle, or as hazard signals.

Among the objects of the invention are to provide a novel method of making such a lens and reflector and to provide novel designs of a combined lens and reflector.

Figure 1:
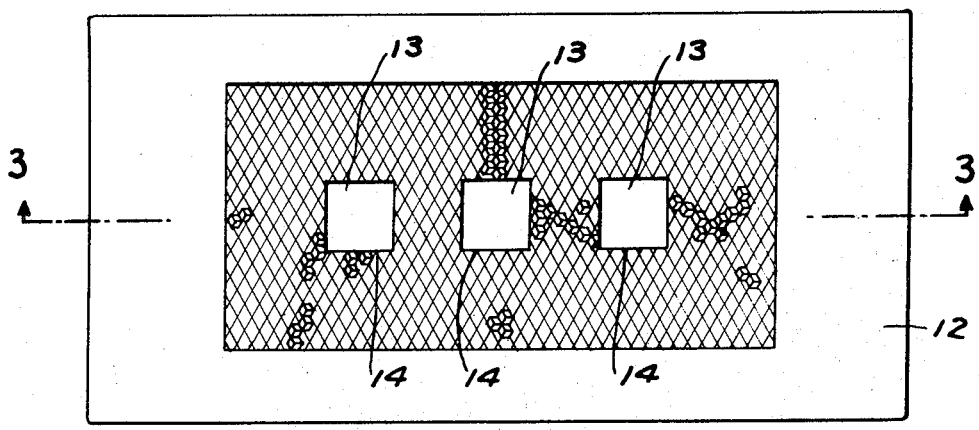
FIG. 1 is a plan view of a master mold made in accordance with the invention.
Figure 2:
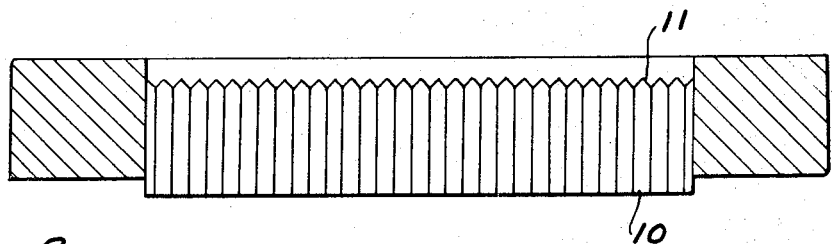
FIG. 2 is a side elevational view of the same.
Figure 3:
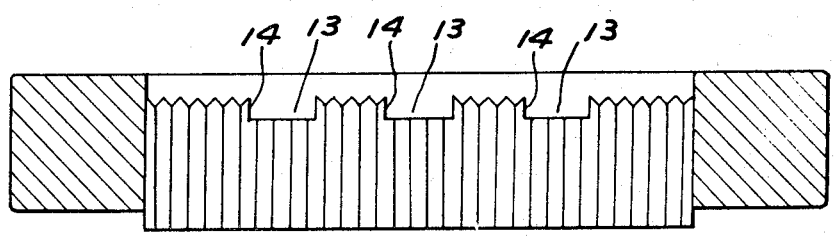
FIG. 3 is a sectional view taken along the line 3—3 in FIG. 1.

Referring to FIGS. 1-3, in accordance with the invention a plurality of pins 10 having shaped ends 11 are assembled in a bundle by a clamp 12 to form a master mold. The pins 10 may have a hexagonal cross section and cubic ends 11 in accordance with well-known construction in the making of reflex prisms.

After the pins 10 are assembled in a bundle, the shaped ends of certain pins 13 are removed by machining at the areas where optics are to be formed in the final article to form depression 14 having a cross section corresponding to the size of the optics or lens areas.

Figure 4:
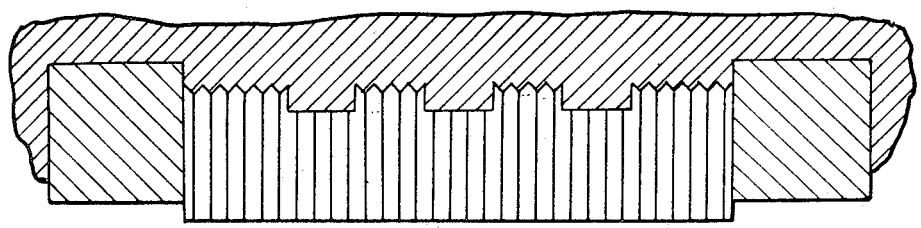
FIG. 4 is a sectional view similar to FIG. 3 showing the electrodeposition of metal on the master mold.
Figure 5:
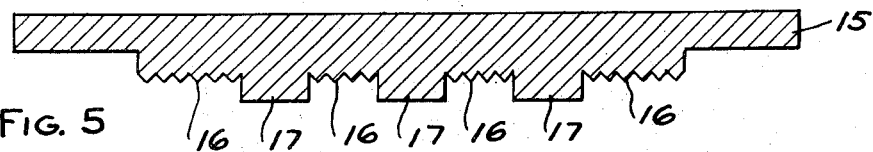
FIG. 5 is a sectional view similar to FIG. 4 showing the construction of the electroformed mold before forming the optics thereon.
Figure 7:
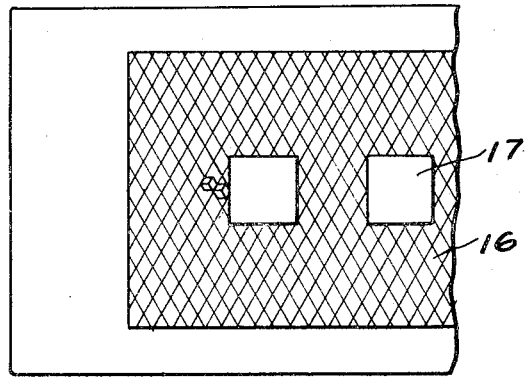
FIG. 7 is a fragmentary plan view of a portion of the mold shown in FIG. 5.
Figure 8:
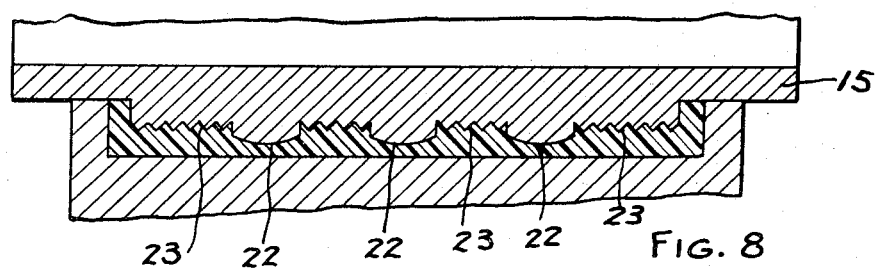
FIG. 8 is a longitudinal sectional view showing the mold for a combined lens and reflector.

As shown in FIG. 4, a mold is then formed on the resultant master by electrodepositing metal onto the shaped ends 11 and depressions 14. This results in an electroformed mold 15 having reflex areas 16 and projections 17 formed at depressions 14 which are at a higher elevation with respect to the body of the mold 15 and are at the areas where lens or optics are to be formed in the final article (FIGS. 5 and 7).

Figures 6, 6A, 6B:
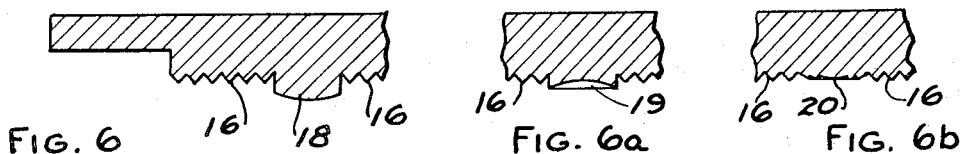
FIGS. 6, 6a and 6b are sectional views showing the different shapes of optics on the electroformed mold.

As shown in FIGS. 6, 6a, 6b, the projections 17 are then shaped by machining as at 18, 19, 20 to form the desired optic shapes in the master mold 15.

Finally, a complementary half 21 is brought into position with respect to mold 5 and a mass of molten plastic is injected to form the resultant combined lens and reflector.

In the final combined lens and reflector, the lens areas 22 are generally below the plane of the reflex areas 23.

The above method can be utilized to form combined lens and reflector units of various configurations such as shown in FIGS. 9-22.

Figure 9:
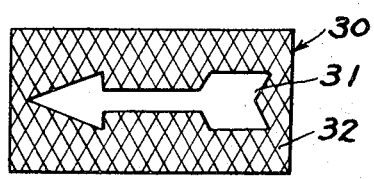
FIGS. 9-22 are plan views of modified forms of combined lens and reflector units.

In the form of the combined lens and reflector unit 30 shown in FIG. 9, the lens portion 31 is in the form of an arrow having a concave surface surrounded by a plurality of reflex prisms 32.

Figure 10:
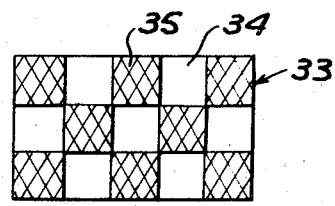

In the form of the combined lens and reflector unit 33 shown in FIG. 10, the lens areas 34 are generally square and have a concave surface and are uniformly distributed with respect to square areas 35 of reflex prisms. The areas 34, 35 are equal in size and uniformly distributed relative to one another.

Figure 11:
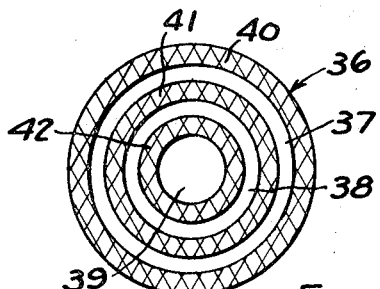

In the form of the combined lens and reflector unit 36 shown in FIG. 11, the lens areas 37, 38, 39 are convex in cross section and extend circumferentially with alternate circumferential areas 40, 41, 42 of reflex prisms.

Figure 12:
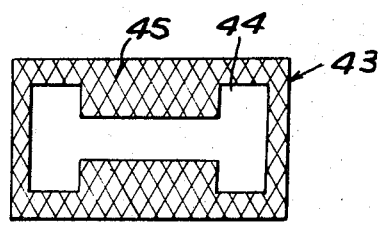

In the form of the combined lens and reflector unit 43 shown in FIG. 12, the lens area 44 has a concave surface and is surrounded by a field of reflex prisms 45.

Figure 13:
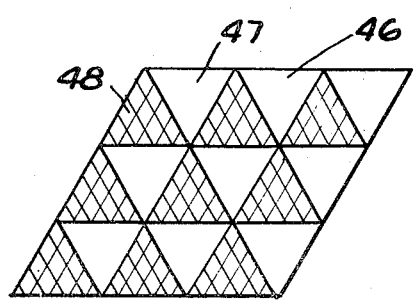

In the form of the combined lens and reflector unit 46 shown in FIG. 13, the lens or optic areas 47 and reflex areas 48 are triangular and are equal in size.

Figure 14:
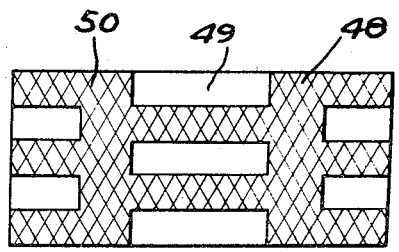

In the form of the combined lens and reflector unit 49 shown in FIG. 14, the lens areas 49 are rectangular and are surrounded by a field 50 of reflex prisms.

Figure 15:
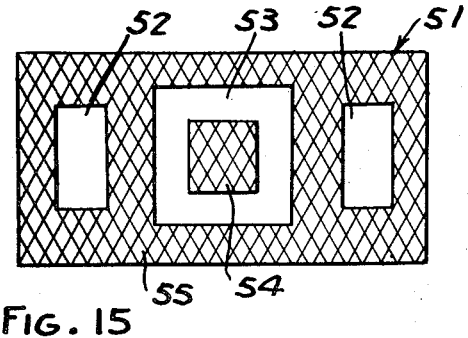

In the form of the combined lens and reflector unit 51 shown in FIG. 15, the lens areas have two shapes, namely, rectangular as at 52 and square as at 53 with a central portion of reflex prisms 54 and a field of reflex prisms 55.

Figure 16:
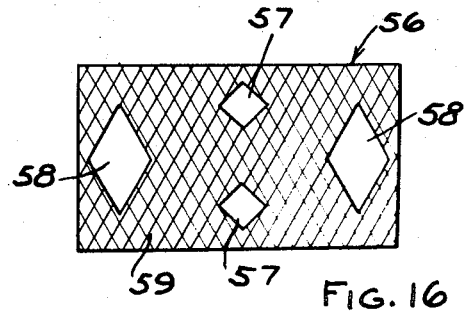

In the form of the combined lens and reflector unit 56 shown in FIG. 16, the lens area comprises diamond-shaped lens areas 57, 58 of different sizes surrounded by a field 59 of reflex prisms.

Figure 17:
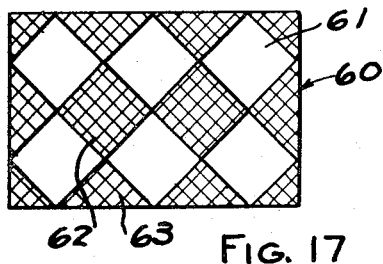

In the form of the combined lens and reflector unit 60 as shown in FIG. 17, the lens areas 61 are square and are provided with their apexes in abutment so that there are intervening square 62 and triangular 63 areas of reflex prisms.

Figure 18:
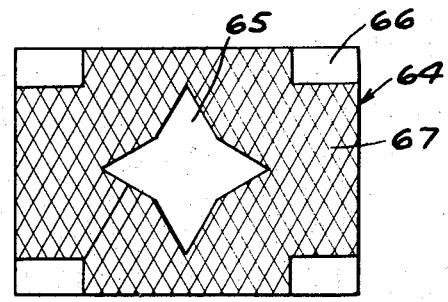
Figure 19:
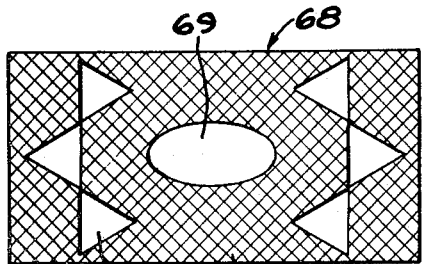

In the form of the combined lens and reflector unit 64 shown in FIG. 18, the unit comprises a central star-shaped lens area 65 with rectangular corner lens area 66 and a field of reflex prisms 67.

In the form of the combined lens and reflector unit 68 shown in FIG. 10, the lens areas are oval as at 69 and triangular as at 70 with a field of reflex prisms 71.

Figure 20:
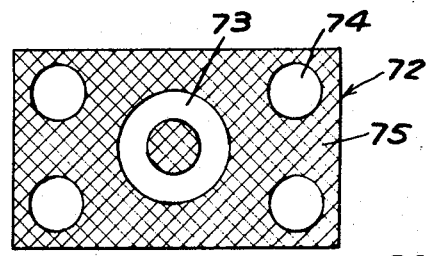

In the form of the combined lens and reflector unit 72 as shown in FIG. 20, there is a central annular lens area 73, corner circular lens area 74 and a field or reflex prisms 75.

Figure 21:
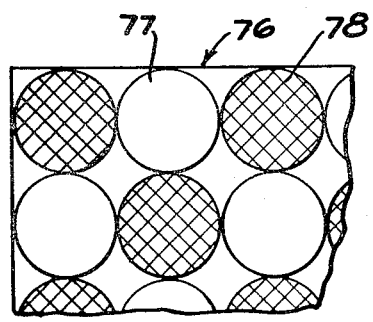

In the form of the combined lens and reflector unit 76 as shown in FIG. 21, the circular lens areas 77 are provided in tangential relation with equally spaced and equal size areas of reflex prisms 78.

Figure 22:
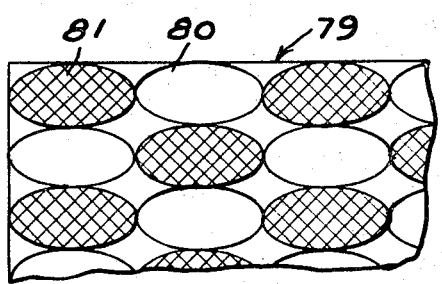

Finally, in the form of the combined lens and reflector unit 79 shown in FIG. 22, oval shaped lens areas 80 are provided in tangential relation to equal size areas 81 of reflex prisms.

In each of the forms of combined lens and reflectors, the reflector is made by electrodepositing material onto a master mold of pins having shaped ends which are bundled together and which have the shaped ends of the pins removed as by machining at the area where the lens are to be formed. The corresponding portions of the electroformed mold are then shaped as by machining to form the desired lens shaped and the resultant electroformed mold with shaped ends or optic areas is utilized to mold the foundation.

I claim:
1. The method of making a mold for a combined lens and reflector which comprises
    assembling a plurality of pins having shaped ends in a bundle,
    removing portions of the shaped ends at areas where optics are to be formed,
    electroforming a mold over the shaped ends and removed portions by electrodeposition,
    shaping the electroformed mold at the areas of the optics to form shaped optical surfaces.
2. The method set forth in claim 1 including the step of molding organic plastic material on the surface of the electroformed mold to form a combined lens and reflector having reflex and optic areas.
3. The method set forth in claim 1 wherein said step of shaping is performed at areas spaced uniformly from one another.
4. The method of making a combined lens and reflector which comprises
    assembling a plurality of metal pins having shaped ends in a bundle,
    removing portions of the shaped ends at areas where lenses are to be formed by machining,
    electroforming a mold over the shaped ends and removed portions by electrodeposition,
    machining the electroformed mold at the areas of the optics to form shaped optical surfaces, and
    molding organic plastic material on the electroformed mold to provide a combined lens and reflector including reflex and optic areas.
5. The method set forth in claim 4 including bringing a complementary mold into position against the electroformed mold and injecting organic plastic material on the surface of the electroformed mold to form a combined lens and reflector having reflex and optic areas.
6. The method set forth in claim 4 wherein said step of machining is performed at areas spaced uniformly from one another.

References Cited

UNITED STATES PATENTS

| | | | |
|---|---|---|---|
| 1,814,758 | 7/1931 | McCarthy | 18—DIG 30 |
| 2,135,873 | 11/1938 | Jones et al. | 204—7 |
| 2,022,639 | 11/1935 | Stimson | 264—1 |
| 2,441,747 | 5/1948 | Beshgetoor | 18—DIG 30 |
| 2,685,231 | 8/1954 | Onksen | 350—103 |
| 2,831,394 | 4/1958 | Heenan et al. | 264—1 |
| 3,258,840 | 7/1966 | Hedgewick et al. | 264—1 |
| D. 213,474 | 3/1969 | Howell | 350—103 |

JULIUS FROME, Primary Examiner

A. H. KOECKERT, Assistant Examiner

U.S. Cl. X.R.

18—DIG 30, 31, 44; 204—6, 7; 264—219; 350—103